United States Patent [19]

Gunderson

[11] 4,005,760
[45] Feb. 1, 1977

[54] TRACTION CONTROL DEVICE

[76] Inventor: Ralph R. Gunderson, 8212 S. Homan, Chicago, Ill. 60652

[22] Filed: May 14, 1973

[21] Appl. No.: 360,300

[52] U.S. Cl. .................................. 180/74; 180/76
[51] Int. Cl.² ........................................ B60K 26/00
[58] Field of Search .................... 180/22, 74, 19 R

[56] References Cited

UNITED STATES PATENTS

| | | | |
|---|---|---|---|
| 1,882,467 | 10/1932 | Wilt | 180/75 |
| 2,771,959 | 11/1956 | Phelps | 180/74 |
| 2,779,426 | 1/1957 | Harris et al. | 180/74 |
| 3,194,337 | 7/1965 | Parks | 180/74 |
| 3,443,657 | 5/1969 | Sarlo | 180/74 |
| 3,447,622 | 6/1969 | Ovshinsky et al. | 180/74 X |
| 3,454,125 | 7/1969 | Wagner | 180/74 |

Primary Examiner—Kenneth H. Betts
Attorney, Agent, or Firm—Hofgren, Wegner, Allen, Stellman & McCord

[57] ABSTRACT

A vehicle, such as a tractor, having propelling wheels connected by a differential, together with a traction control device for connecting the propelling wheels directly when the differential permits relative motion between the propelling wheels, including a rotatable shaft having friction rollers secured thereon at axially spaced positions to engage the propelling wheels, lever means pivotally mounted on the vehicle chassis and having bearings for supporting the rotatable shaft, and handle means connected with the lever means for moving the friction rollers into contact with the propelling wheels.

10 Claims, 7 Drawing Figures

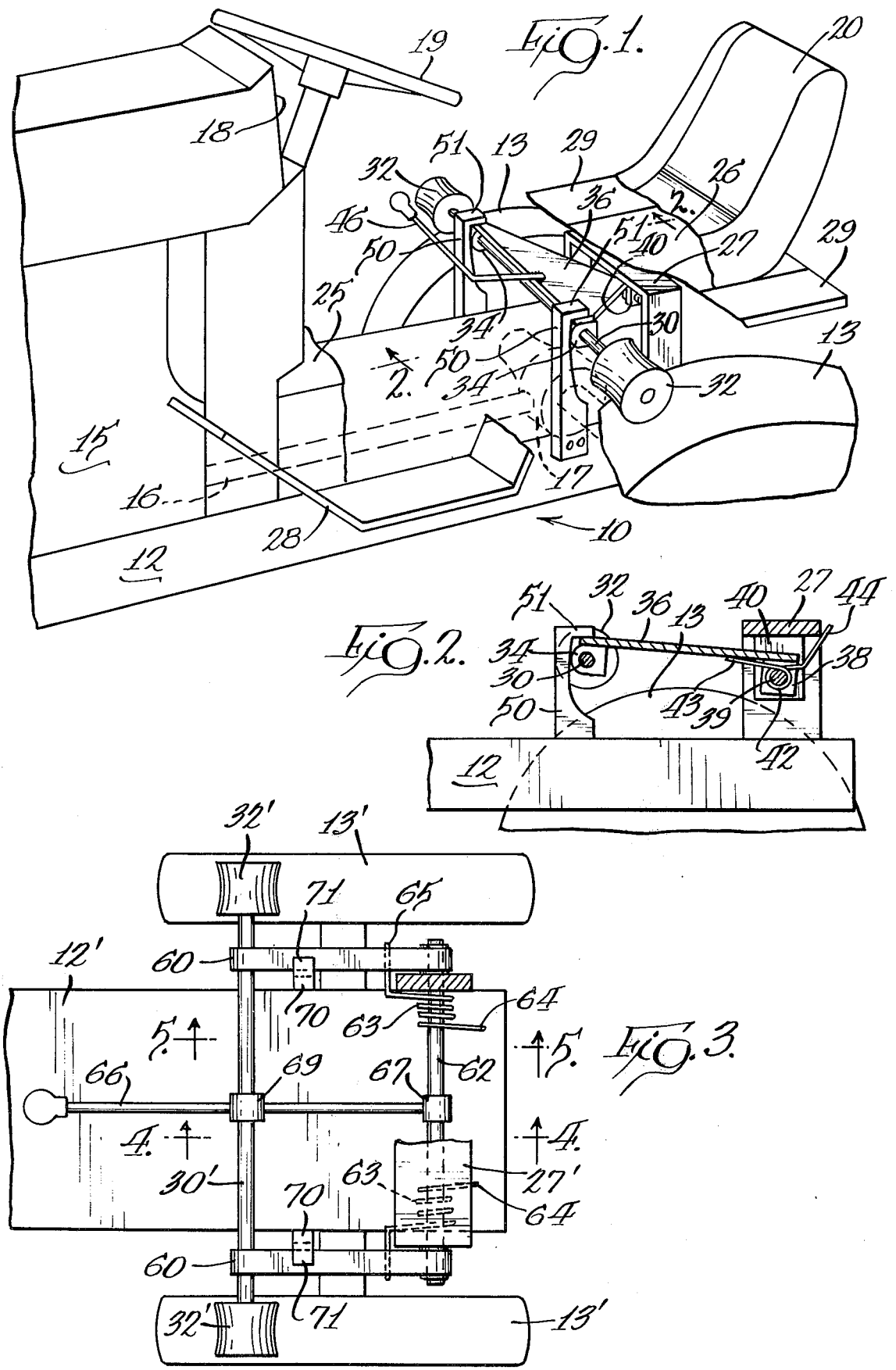

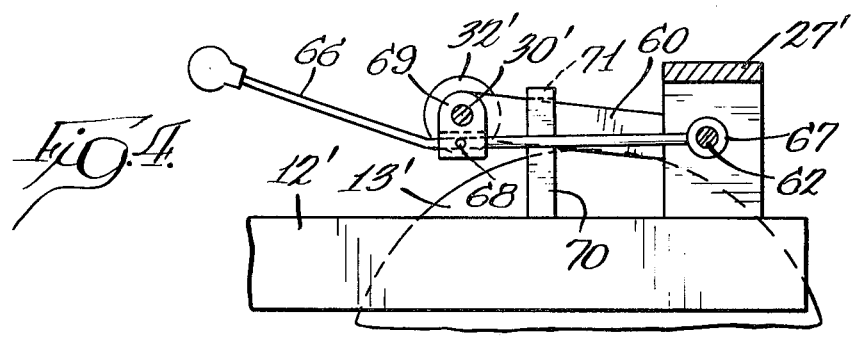
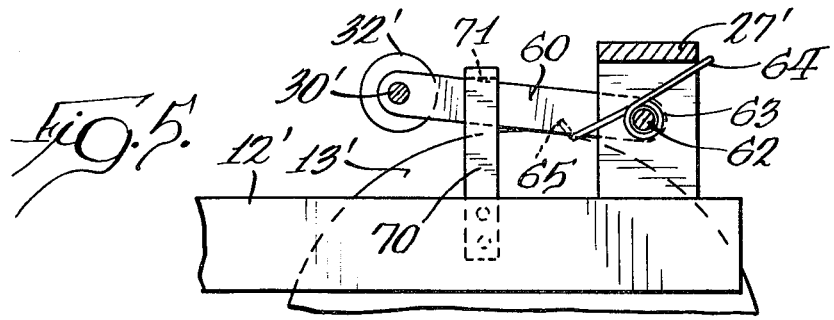
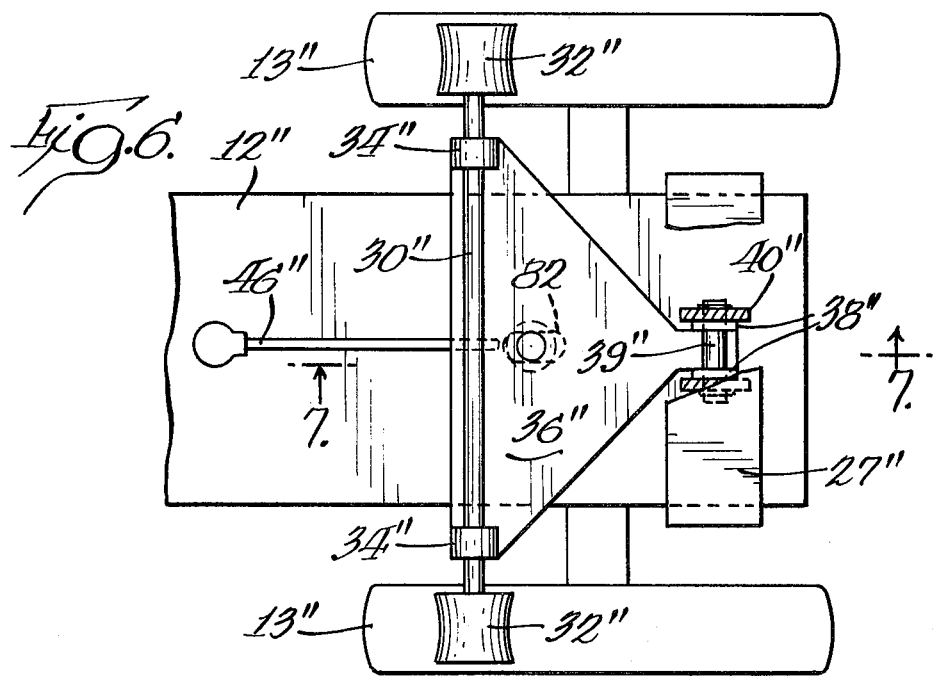
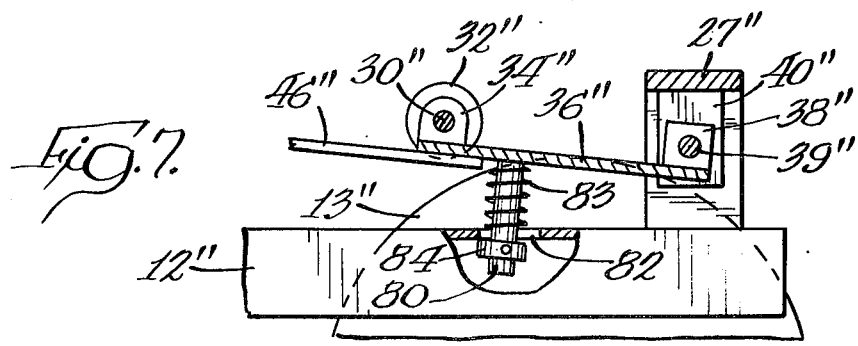

TRACTION CONTROL DEVICE

BACKGROUND OF THE INVENTION

The present invention relates to a traction control device for use in connection with a vehicle having propelling wheels driven through a differential which permits relative motion between the propelling wheels, and includes means for connecting the propelling wheels directly by means of a rotatable shaft having friction rollers movable into and out of contact with the propelling wheels.

In the prior art, U.S. Pat. No. 1,882,467 relates to a traction device utilizing a shaft for postively connecting propelling wheels by means of intermeshing gearing on the shaft and the propelling wheels.

U.S. Pat. No. 3,447,622 relates to a device for coupling the vehicle drive wheels including a pneumatically actuated, pivotally mounted cross shaft with auxiliary wheels engageable with the vehicle propelling wheels, in an arrangement where the coupling device is mounted on the housing containing the axle connecting the propelling wheels.

U.S. Pat. No. 3,454,125 shows an external differential lockup with a hydraulically actuated shaft reciprocally mounted on the vehicle body and having corrugated rollers engageable with propelling wheels.

My prior application Ser. No. 337,917 filed Mar. 5, 1973, relates to traction control devices in which the bearing means for the torque transfer shaft are reciprocally mounted on the vehicle chassis.

It would be desirable to provide an improved traction control device which is simply mounted by lever means directly connected with an actuating handle.

BRIEF SUMMARY OF THE INVENTION

The present invention relates to a new and improved traction control device for use in a vehicle having propelling wheels connected by a differential, including means for directly connecting the propelling wheels when the differential permits relative motion between the propelling wheels, in the form of a rotatable shaft having friction rollers thereon at axially spaced positions to engage the propelling wheels, lever means pivotally mounted on the chassis and supporting the rotatable shaft, together with means limiting twisting movement of the lever and the shaft in the plane of the lever and the shaft while permitting differential motion of the friction elements toward the propelling wheels.

Another object is to provide a new and improved traction control device usable with existing vehicle structures without substantial modification of the existing propulsion means including pivotal lever means for supporting a torque transfer shaft and connected directly with manually accessible handle means selectively operable to prevent relative motion between the propelling wheels of the vehicle.

In one form of the invention illustrated herein, the lever means supporting the torque transfer shaft comprises a generally triangularly shaped plate which is pivotally mounted adjacent one corner thereof and which carries bearing means for the torque transfer shaft adjacent the other two corners thereof, together with a handle secured directly to the plate.

The pivotally mounted plate supporting the torque transfer shaft preferably is resiliently biased toward a retracted position, and means is provided for guiding movement of the plate in a manner to restrict twisting in the plane of the plate while at the same time permitting differential motion of the rollers toward the propelling wheels to accommodate situations where the outer diameter of the two propelling wheels might not be identical for one reason or the other.

In one construction illustrated herein, the guide means controlling movement of the pivoted plate includes a pair of arcuate guides respectively engaging the pivoted plate adjacent the shaft bearings to restrict twisting of the plate in the plane of the plate while permitting differential movement of the rollers toward the wheels. In another construction, the plate is guided by means of a plunger on the plate movable in a guide on the chassis.

An alternative embodiment incorporating the principles of the present invention includes a pair of separate levers pivotally mounted on the chassis on a common axis and respectively carrying bearings for supporting the torque transfer shaft, together with a lever pivotally mounted on the chassis adjacent an operator's station and pivotally connected to the shaft to move the friction rollers into contact with the propelling wheels.

BRIEF DESCRIPTION OF THE DRAWINGS

FIG. 1 is a fragmentary perspective view of a vehicle such as a garden tractor with a traction control device embodying the principles of the present invention;

FIG. 2 is a fragmentary sectional view taken at about the line 2—2 of FIG. 1;

FIG. 3 is a fragmentary plan view of a vehicle similar to that illustrated in FIG. 1, showing an alternative embodiment of a traction control device embodying the principles of the present invention;

FIG. 4 is a sectional view taken at about the line 4—4 of FIG. 3;

FIG. 5 is a sectional view taken at about the line 5—5 of FIG. 3;

FIG. 6 is a fragmentary plan view of a vehicle similar to that illustrated in FIG. 1, showing another embodiment of a traction control device embodying the principles of the present invention; and FIG. 7 is a sectional view taken at about the line 7—7 of FIG. 6.

DETAILED DESCRIPTION OF FIGS. 1 AND 2

Referring now to FIG. 1, a traction control device embodying the principles of the present invention is illustrated in connection with a garden tractor 10 including a chassis 12 supported on wheels including a pair of rear propelling wheels as at 13 and a pair of front steering wheels (not visible). In the tractor illustrated, there is a prime mover in the form of a gasoline engine 15 on the front of the chassis 12 connected to drive an appropriate transmission including a drive shaft 16 in turn arranged for rotating the propelling wheels 13 through a final differential 17. The engine is adapted to be controlled from a control panel 18 located adjacent to a steering wheel 19 arranged to control the front wheels of the vehicle. The control panel 18 and the steering wheel 19 are located adjacent to a seat 20 on which an operator may be seated in a position accessible to the steering wheel and the control panel for appropriately controlling the engine 15 and the transmission mechanism driven thereby.

Preferably, the vehicle includes a floor and fender panel 25 having a front end appropriately secured to the chassis 12, and a rear end portion 26 disposed beneath the seat 20 and supported on a transverse beam 27 on the chassis 12 between the propelling wheels 13. As shown in more detail in copending application Ser. No. 337,917, the floor and fender panel 25 preferably includes foot rests 28 at opposite sides of the chassis 12 and associated fenders 29 at opposite sides of the seat overlying the propelling wheels 13.

A traction control device for directly connecting the propelling wheels 13 is mounted beneath the floor and fender panel 25. The traction control device includes a transversely extending shaft 30 having friction rollers 32 secured on opposite ends thereof and axially spaced at positions which enable movement of the friction rollers into and out of contact with the periphery of the rubber-tired wheels 13. The shaft 30 is rotatably supported in spaced bearings 34 in turn mounted on the under side of a pivoted lever in the form of a triangularly shaped plate 36. The plate is mounted in a manner to permit movement of the shaft 30 toward and away from the propelling wheels 13. The friction rollers 32 may be molded of relatively hard but somewhat yieldable plastic material carrying studs which provide adequate traction for transferring torque from one of the propelling wheels 13 to the other. The bearings 34 may comprise molded blocks of suitable plastic bearing material appropriately secured to the plate 36.

In order to pivotally mount the triangular plate 36, it is formed adjacent one corner with a pair of spaced ears as at 38 supported by a pivot pin 39 in turn mounted in a pair of spaced ears 40 depending from the under side of the transverse beam 27 on the chassis 12. In order to resiliently urge the pivoted plate 36 upwardly toward a retracted position where the torque transfer rollers 32 are out of contact with the propelling wheels 13, a coiled torsion spring 42 is mounted around the pivot pin 39, with one end 43 engaging the plate 36 and an opposite end 44 reacting against the transverse beam 27. In order to provide for movement of the triangular plate 36 downwardly in a direction to move the friction rollers 32 into contact with the propelling wheels 13, a handle 46 is secured to the front of the plate as by welding and projects forwardly through an aperture in the floor panel 25 so that a free end thereof is accessible to an operator on the seat 20.

The plate 36 is preferably loosely mounted on the pivot pin 39 in a manner which will permit tilting of the plate so as to allow differential movement of the friction rollers 32 toward the propelling wheels 13 in the event that one of the propelling wheels may be larger or smaller than the other. For example, the ears 38 may have a clearance on pin 39 on the order of 0.010 inch, as a result of which the free end of the plate has greater movement because of its length. With such an arrangement, the plate 36 is free to wobble or tilt so that both friction rollers 32 may firmly contact the propelling wheels even though the friction rollers may have to be moved different distances to contact propelling wheels of different sizes.

In order to guide movement of the pivoted plate 36 in a manner to restrict swinging of the plate in the plane of the plate, while still permitting differential movement of the rollers 32 toward the propelling wheels 13, the bearings 34 respectively engage arcuately curved guide tracks 50 secured to opposite sides of the chassis 13. At the upper end of the guide tracks 50, each is formed with a rearwardly extending flange 51 which functions as a stop, limiting upward movement of the plate 36 away from the propelling wheels 13 under the influence of the spring 42. Contact of the bearings 34 with the guide tracks 50 permits free pivotal movement of the plate 36 about the pivot pin 39 while at the same time even allowing differential movement of the rollers 32 toward the propelling wheels, but nevertheless preventing swinging movement of the plate 36 in the plane of the plate about a vertical axis passing through the pivot pin 39.

In operation, the spring 42 normally urges the plate 36 upwardly to maintain the friction rollers 32 out of contact with the propelling wheels 13. With the friction rollers retracted, as illustrated, the manual handle 46 is elevated to the position illustrated. In the event of a situation where one propelling wheel 13 is disposed on a slippery surface such as ice, and the other wheel is located on a tractive surface, such that one wheel spins while the other is stationary, and the progress of the vehicle is interrupted, the manual handle 46 may be moved downwardly to a position where the friction rollers 32 are moved into frictional tractive contact with propelling wheels 13. Under these circumstances, the motion of the spinning wheel is transferred to the stationary wheel, so that the two wheels travel in unison and the wheel on the tractive surface is utilized for propelling the vehicle out of the stalled condition. If desired, provision may be made for locking the manual lever 46 in operative position with the friction rollers in contact with the propelling wheels, in a manner taught in my aforementioned application Ser. No. 337,917.

It should also be understood that the traction control device may be utilized in a braking situaton, if one of the propelling wheels locks on a slippery surface such as ice on a steep incline, and the other wheel tends to rotate on a tractive surface and permit vehicle motion. Under these circumstances, the friction roller in contact with the locked wheel will prevent rotation of the other wheel, so that restraint of the wheel on the tractive surface results in retarding motion of the vehicle.

DESCRIPTION OF FIGS. 3-5

In FIGS. 3–5, an alternative traction control device is illustrated in connection with a vehicle similar to that referred to in FIGS. 1 and 2. In order to simplify the description, parts in FIGS. 3–5 corresponding to similar parts in FIGS. 1 and 2 are designated by similar reference numbers bearing a prime suffix. The vehicle includes a chassis 12' with propelling wheels 13', and a transverse beam 27' supported on the chassis 12'. A transverse shaft 30' has friction rollers 32' secured thereon at opposite ends in spaced positions corresponding to the spacing of the propelling wheels 13', so that the friction rollers 32' may be moved into and out of contact with the propelling wheels 13'.

In the construction of FIGS. 3–5, the transverse shaft 30' is rotatably supported at spaced positions in bearings carried respectively at the ends of a pair of pivoted levers 60 mounted respectively at opposite sides of the chassis 12'. As illustrated herein, the levers 60 are pivotally mounted at opposite ends of a pivot shaft 62 suitably mounted on the chassis 12'. The levers 60 are separately urged upwardly toward a retracted position by means of a coiled torsion spring 63 having one end 64 bearing against the transverse beam 27' and an opposite end 65 bearing against the pivoted lever 60. In this manner, the shaft 30' and the friction rollers 32' are yieldably urged upwardly toward a retracted position where the rollers 32' are out of contact with the propelling wheels 13'.

In order to facilitate movement of the shaft 30' and the rollers 32' in a direction toward the propelling wheels 13', a manually accessible handle 66 has an end portion pivotally mounted at 67 on the shaft 62. Additionally, an intermediate portion of the handle lever 66 is pivotally connected at 68 to a link 69 pivotally mounted on the shaft 30'.

In order to limit retracting movement of the levers 60 under influence of the springs 63, a stop bracket 70 is mounted on the chassis 12' adjacent each lever 60, and at the top, each stop bracket 70 includes a laterally extending flange 71 engagable by the lever 60.

The operation of the device illustrated in FIGS. 3 to 5 is similar to the operation of that described in FIGS. 1 and 2. Springs 63 normally yieldably urge the friction rollers 32' to the elevated position illustrated, out of contact with the propelling wheels 13'. In the event of relative motion between the propelling wheels 13' in a manner to abort the intended operation of the vehicle, the friction rollers 32' may be moved into contact with the propelling wheels 13' in a manner to bypass the differential which normally permits relative motion between the wheels 13'. With the friction rollers 32' in contact with the propelling wheels, the propelling wheels are locked together. Thus, if one wheel is spinning on ice without propelling the vehicle, the motion of the spinning wheel is transmitted to the opposite wheel on a tractive surface, to put the vehicle in motion. In a braking situation, if one propelling wheel is locked on ice, and the other is rolling, the friction rollers may be utilized to lock the rolling wheel on a tractive surface and thereby brake the vehicle. The levers 60 are mounted on the pivot shaft 62 and the roller shaft 30' with limited clearance on the order of 0.010 inch, or with rounded bearings in a manner to permit relative movement between the levers, so that the rollers 32' are movable differentially toward the propelling wheels to tractively engage the wheels even if the wheels are of different size.

DESCRIPTION OF FIGS. 6 AND 7

In the embodiment of FIGS. 6 and 7, a traction control device embodying the principles of the present invention is illustrated in connection with a vehicle similar to that described in connection with FIGS. 1 and 2. Parts in FIGS. 6 and 7 corresponding to similar parts in FIGS. 1 and 2 have been designated by similar reference numbers bearing a double prime suffix. A chassis 12" has propelling wheels 13". A transverse shaft 30" has friction rollers 32" secured on opposite ends thereof at positions adapted to engage the propelling wheels 13". The shaft 30" is rotatably mounted in bearings 34" disposed adjacent two corners of a triangularly shaped plate 36". In order to provide for pivotal mounting of the plate 36", it is formed adjacent one corner thereof with ears as at 38" mounted on a pivot pin 39" in turn supported on depending ears 40" on the bottom of the transverse beam 27".

In order to control the movement of the pivoted plate 36", the plate includes a downwardly extending plunger 80 which projects through an aperture 82 in the chassis 12". For reasons that will appear, the aperture 82 is elongated in a front-to-rear direction and has a lateral width corresponding substantially to the dimeter of the plunger 80. A coiled compression spring 83 is positioned around the plunger 80 and has an upper end bearing against the plate 36" while a lower end thereof engages the chassis 12" in a manner such that the spring functions to normally resiliently urge the plate 36" to an upper retracted position where the friction rollers 32" are out of contact with the propelling wheels 13". The lower end of the plunger 80 carries a collar 84 fixed thereon and engageable with the chassis 12" beneath the aperture 82 for purposes of limiting the extent of upper movement of the plate 36".

In operation, the function of the plate 36" in FIGS. 6 and 7 is similar to that described in connection with FIGS. 1 and 2. Normally, the plate 36" is held in the retracted position illustrated in FIG. 7 by means of the spring 83. When it is desired to move the friction rollers 32" into contact with the propelling wheels 13", the handle 46" is manually accessible for pivoting the plate 36" about the pivot pin 39". The movement of the plunger 80 in the aperture 82 guides the plate 36" in a manner to prevent significant swinging motion of the plate 36" in the plane of such plate about a vertical axis passing through the pivot pin 39". Nevertheless, the plate ears 38" are loosely mounted on the pivot pin 39" in a manner which permits some wobble of the plate 36" so that the friction rollers can move differentially toward the propelling wheels 13" in the event the wheels are not of identical size.

I claim:

1. In a vehicle having a chassis with propelling wheels connected by a differential, a traction control device for connecting the propelling wheels directly when the differential permits relative motion between the wheels, comprising,
   a. a rotatable shaft having friction elements fixed thereon spaced apart axially to engage the propelling wheels of the vehicle,
   b. bearing means rotatably supporting the shaft at spaced positions between the friction elements thereon,
   c. lever means pivotally mounted on the chassis and supporting the bearing means, said lever means including a generally triangular wobble plate pivotally mounted adjacent one corner thereof and having the shaft bearing means supported thereon adjacent the two other corners,
   d. means normally urging the lever means in a direction to move the friction elements out of contact with the propelling wheels,
   e. means connected to the lever means to move the shaft and the friction elements toward the propelling wheels, and
   f. means limiting twisting of the lever means in the plane of the lever means and shaft while permitting differential movement of the friction elements toward the propelling wheels.

2. In a vehicle having a chassis with propelling wheels connected by a differential, a traction control device operable from an operator's station on the vehicle for connecting the propelling wheels directly when the differential permits relative rotation between the wheels, comprising: a rotatable shaft having friction elements fixed thereon spaced apart axially to engage the propelling wheels of the vehicle; bearing means rotatably supporting the shaft at spaced positions between the friction elements thereon; lever means having a mounting pivotally secured to the chassis and supporting the bearing means, the mounting being provided with limited differential movements to afford limited tiltability of the lever means; and means positioned adjacent the operator's station and being connected to the lever means to swingably move the shaft and the friction elements into engagement with the propelling wheels, said tiltability of the lever means permitting one of the friction elements to be swung through a greater distance than the other friction element in the event the propelling wheels are of differing diameters.

3. A traction control device as specified in claim 2 in which spring means are provided for normally urging the lever means in a direction to move the friction elements out of contact with the propelling wheels.

4. A traction control device as specified in claim 3 in which stop means are provided to limit retracting movement of the lever means.

5. A traction control device as specified in claim 4 in which guide means are provided for the lever means to direct the friction elements toward the propelling wheels.

6. A traction control device as specified in claim 2 in which guide means are provided for the lever means to direct the friction elements toward the propelling wheels.

7. A traction control device as specified in claim 6 in which the guide means are positioned to slidably engage and to reinforce the bearing means when the friction elements are in engagement with the propelling wheels.

8. A traction control device as specified in claim 2 in which the lever means includes a pair of arms, said arms supporting the bearing means.

9. A traction control device as specified in claim 2 in which the mounting is positioned adjacent the rear end of the lever means, the bearing means is positioned adjacent the forward end of the lever means, and the means for swingably moving the shaft and friction elements extends forwardly of the lever means.

10. A traction control device as specified in claim 9 in which the lever means is shaped to diverge outwardly in a direction forwardly of the mounting.

* * * * *